S. P. KNIGHT.
Improvement in Coating Electrotype-Molds.
No. 131,169. Patented Sep. 10, 1872.
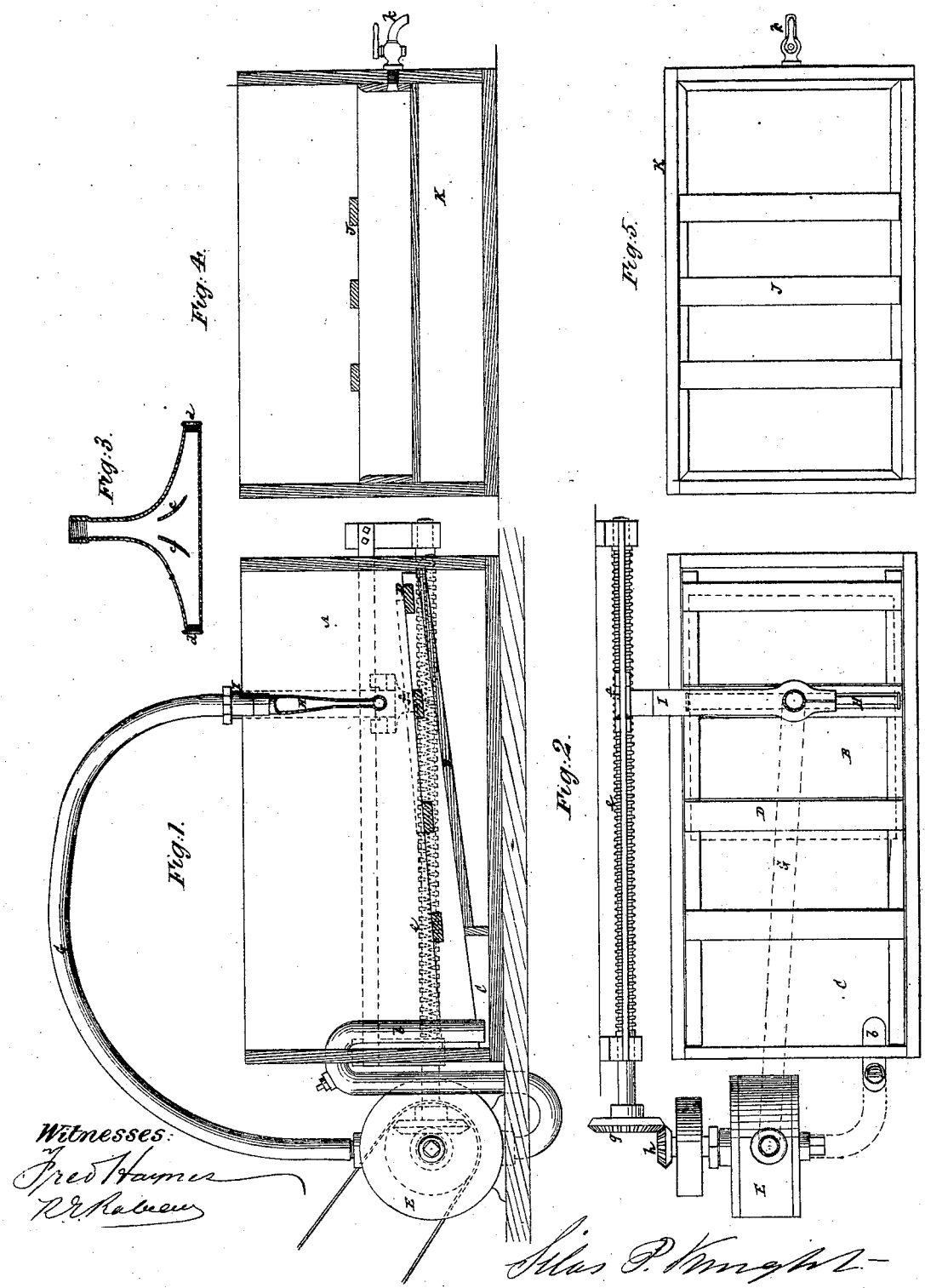

UNITED STATES PATENT OFFICE.

SILAS P. KNIGHT, OF BROOKLYN, NEW YORK.

IMPROVEMENT IN COATING ELECTROTYPE-MOLDS.

Specification forming part of Letters Patent No. 131,169, dated September 10, 1872; antedated September 5, 1872.

Specification describing an Apparatus for Obtaining and Metallicizing Electrotype-Molds, the invention of SILAS P. KNIGHT, of the city of Brooklyn, in the county of Kings and State of New York.

This invention relates to apparatus for obtaining and metallicizing electrotype-molds in accordance with the process described in Letters Patent No. 114,447, issued to me May 2, 1871, and in which the surface of the wax or molding composition of which an electrotype-mold is made was prepared for the reception of the impression; also the mold metallicized for reception of the electro deposit, by treatment with a mixture of plumbago or other metallic powder and water, in distinction to the ordinary process of preparing the surface and metallicizing the mold with dry plumbago. The invention consists in an apparatus composed of a trough or vat for holding the mold, wax, or composition surface to be treated, face uppermost, a pump or distributer, and a traversing sprinkler, for circulating the mixture hereinbefore specified, and for showering it over the mold. The invention also includes a novel and advantageous construction of sprinkler; likewise various combinations of details.

In the accompanying drawing which forms part of this specification, Figure 1 represents a longitudinal vertical section of an apparatus constructed in accordance with my invention; Fig. 2, a plan of the same; and Fig. 3, a longitudinal section of the sprinkler detached. Fig. 4 is a vertical section of a vat or bath for washing the mold, and Fig. 5 a plan of the same.

Similar letters of reference indicate corresponding parts throughout the several figures of the drawing.

A represents a vat having an inclined false bottom, B, that stops short at its lower end, so as to form a well, C. This false bottom serves to receive upon it a removable frame, D, upon which the mold to be treated, face uppermost, is placed. E is a pump, of any suitable description, arranged to connect by a siphon-like or bent suction-pipe, b, with the well C, and having attached to it a flexible discharge pipe or hose, G, which connects with a sprinkler, H, that extends down into the vat over the mold on the frame D, and is carried by a sliding frame, I, which travels the length of the vat, or thereabouts. Said sprinkler is of a spread-out or fan-shape, and of a perforated tubular construction at its delivery end, so as to take in the width of the mold. It is also provided with internal deflectors $c\ c$, for insuring an equal distribution of the mixture to the perforated mouth of the sprinkler; likewise with one or more screw-taps, $d$, for facilitating the cleaning of the sprinkler. The frame I is traversed automatically along the vat by means of a revolving traverse screw, $e$, and box $f$, attached to said frame.

The operation is as follows: The surface of the wax or composition in the molding-case is first brushed over with a mixture of plumbago and water, and after this the impression is taken upon it in the usual way. If desired, however, instead of brushing the wax or composition in the molding-case with the mixture, as described, it may be treated in the apparatus shown in the drawing for metallicizing the mold, and in like manner, only for a shorter period of time. The mold to be metallicized is placed, face uppermost, upon the frame D, which is then lowered to its place on the inclined bottom, B. Prior to this, however, a suitable quantity of the mixture of plumbago and water is introduced into the well C, or lower portion of the vat A. The pump E is then set in motion, as also the traverse-screw $e$, and the mixture drawn up by the pump from the vat and thrown regularly and evenly by or through the hose G and sprinkler H in innumerous fine streams on the mold, the travel of the sprinkler backward and forward along the vat, by means of the traverse-screw $e$ and sliding frame I, effecting perfect distribution over the whole surface of the mold. The traverse-screw $e$ may be revolved by means of bevel-gear $g\ h$ connecting it with the pump, or it may be otherwise operated, or any suitable traversing device be substituted for the screw. Surplus mixture thrown by the pump onto the mold runs off the latter back into the bottom of the vat A or into the well C, and is used over and over again, so that a thorough agitation of the mixture is kept up. A sufficient film of plumbago having been thus obtained upon the surface of the mold to obtain a perfect conducting surface, the blank space surrounding the impression may be scraped, or have a little of some greasy substance rubbed over it, to render it non-conducting to electricity. The mold, or frame D having the mold upon it, is then removed from the vat A, and said mold placed, face uppermost, upon a frame or tray, J, which is constructed to constitute a removable false bottom within a bath or secondary vat, K. The mold being placed upon this tray, and the latter lowered to its place in the vat K, a gentle stream of water is passed over the mold to remove any surplus plumbago and to wet the entire surface of the mold. This stream or current may be established by introducing a sufficient quantity of water in the vat above the mold and opening a cock, $k$, in communication with the tray. Any deposit of plumbago in the tray may afterwards be removed and be returned to the vat A, so that none is wasted. If found necessary the mold, after having been treated with the mixture of plumbago and water, as above described, and before being washed, may, without injury to the impression, have passed over its face a bristle-brush having the ends of the bristles unclipped.

The mixture of plumbago and water used in the above-described operation may consist of about one pound of plumbago for every gallon of water, though this density may be varied. To prepare and facilitate the mixture, enough alcohol may be first applied to the dry plumbago to moisten it, and then the water may be added. Bronze powder or other fine metallic powder may be substituted for plumbago, if desired.

In some cases the sprinkler H might be stationary, and the vat A be traversed or reciprocated. This I regard as an equivalent to the arrangement herein described, and when adopted, the tube G may be a rigid one.

What is here claimed and desired to be secured by Letters Patent, is—

1. The combination, with the trough or vat A, of the pump E and traversing sprinkler H, substantially as and for the purpose or purposes herein set forth.

2. The combination of the removing frame D with the inclined false bottom B of the vat A, essentially as described.

3. The flexible tube or hose G, in combination with the pump E and traversing sprinkler H.

4. The sprinkler H, constructed substantially as described, and provided with deflectors $c$ within its body.

SILAS P. KNIGHT.

Witnesses:
FRED. HAYNES,
R. E. RABEAU.